(12) United States Patent
Chen (10) Patent No.: US 8,040,669 B2
(45) Date of Patent: Oct. 18, 2011

(54) ADJUSTABLE SHIFTING STRUCTURE AND DISPLAY DEVICE USING THE SAME

(75) Inventor: Ta-Wei Chen, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 251 days.

(21) Appl. No.: 12/320,808

(22) Filed: Feb. 5, 2009

(65) Prior Publication Data
US 2010/0039755 A1    Feb. 18, 2010

(30) Foreign Application Priority Data
Aug. 15, 2008    (TW) ................................ 97131302 A (51) Int. Cl.
     *G06F 1/16* (2006.01)
(52) U.S. Cl. ......... 361/679.21; 361/679.02; 361/679.22; 248/157; 248/919
(58) Field of Classification Search ............. 361/679.29; 248/157
See application file for complete search history.

(56) References Cited

U.S. PATENT DOCUMENTS

| | | | |
|---|---|---|---|
| 2,697,572 A | | 12/1954 | Pfankuch |
| 5,944,293 A | * | 8/1999 | Loy ........................... 248/220.21 |
| 6,061,104 A | * | 5/2000 | Evanicky et al. .......... 248/274.1 |
| 6,712,321 B1 | * | 3/2004 | Su et al. .................... 248/123.11 |
| 7,237,755 B2 | * | 7/2007 | Cho et al. .................. 248/274.1 |
| 7,389,963 B2 | * | 6/2008 | Cho et al. .................. 248/159 |
| 7,490,370 B2 | * | 2/2009 | Macey et al. .................... 4/559 |
| 7,764,491 B2 | * | 7/2010 | Zhao et al. ............... 361/679.22 |
| 7,789,355 B2 | * | 9/2010 | Gan et al. ...................... 248/157 |
| 7,835,146 B2 | * | 11/2010 | Zhou ....................... 361/679.29 |
| 2004/0035994 A1 | * | 2/2004 | Cho et al. .................. 248/276.1 |
| 2004/0084588 A1 | * | 5/2004 | Liu et al. ................... 248/291.1 |
| 2007/0097617 A1 | * | 5/2007 | Searby et al. ................. 361/686 |
| 2009/0050759 A1 | * | 2/2009 | Csak ........................ 248/227.1 |
| 2009/0184224 A1 | * | 7/2009 | Gan et al. .................. 248/283.1 |
| 2009/0256047 A1 | * | 10/2009 | Zhao et al. ...................... 248/408 |

OTHER PUBLICATIONS

The Official Action of corresponding CN application No. 200810146305.8 dated Nov. 16, 2010 and an English translation of p. 3, lines 3-end of page, p. 4, and p. 5, lines 106.

* cited by examiner

*Primary Examiner* — Jinhee Lee
*Assistant Examiner* — Anthony Q Edwards
(74) *Attorney, Agent, or Firm* — Bacon & Thomas, PLLC (57) ABSTRACT

An adjustable shifting structure is disclosed. The adjustable shifting structure comprises a base bracket, a movable bracket, a fixture element, and an adjustment element. The movable bracket is movably connected to the base bracket. The fixture element is disposed on the base bracket. The movable bracket is gripped by the fixture element and the base bracket to limit the moving direction of the movable bracket. The adjustment element extends through the base bracket, the movable bracket and the fixture element. The movable bracket may be moved by adjusting the adjustment element to apply force on the fixture element.

10 Claims, 7 Drawing Sheets

ADJUSTABLE SHIFTING STRUCTURE AND
DISPLAY DEVICE USING THE SAME

BACKGROUND OF THE INVENTION

1. Field of the Invention

The present invention relates to an adjustable shifting structure, and more particularly, to an adjustable shifting structure applied to a display device to provide the functions of stable support or adjustment in the position for the display device.

2. Description of the Related Art

The flat panel display device has a lot of advantages in design, such as thinness and saving space, so it is gradually replacing the traditional CRT (cathode ray tube) display device in the market. In order to properly furnish the flat panel display device, a shifting hanging mechanism is disposed on the housing of the display device for supporting the flat panel display device. The shifting hanging mechanism uses generally a constant force spring to push forward the loading object. Under the design, the supporting force provided by the constant force spring must be adjusted according to the weight of the loading object and its center of gravity. If the specification or the weight of the flat display device is changed, the elastic force of the constant force spring must be adjusted again, or the shifting hanging mechanism must be replaced with another. This increases the manufacturing cost and inconvenience of assembling or adjusting the flat panel display device. Furthermore, it is difficult to adjust the position of the flat panel display device because the position and the elastic force of the constant force spring must be controlled accurately.

SUMMARY OF THE INVENTION

A main objective of the present invention is to provide an adjustable shifting structure which is capable of adjusting the height for different requirements and enhancing the stability.

In order to achieve the aforementioned objective, an adjustable shifting structure of the present invention comprises a base bracket, a movable bracket, a fixture element, and an adjustment element. The movable bracket is movably connected to the base bracket; the fixture element is connected to the base bracket, and the movable bracket is gripped by the fixture element and the base bracket to limit the moving direction of the movable bracket; and the adjustment element is extended through the base bracket, the fixture element and the movable bracket, and the movable bracket is moved by adjusting the adjustment element to apply force on the fixture element so as to change the position of the movable bracket. Accordingly, the height of the adjustable shifting structure of the present invention can be adjusted for different requirements to enhance the convenience of the adjustable shifting structure of the present invention.

A display device of the present invention comprises a display screen, a loading seat, and an aforementioned adjustable shifting structure. The loading seat is connected to the display screen, and the adjustable shifting structure is connected to the loading seat. The loading seat can be moved by adjusting the adjustable shifting structure to adjust the height of the display device, and the stability of the display device can be maintained during the adjusting process of the display device.

DETAILED DESCRIPTION OF THE PREFERRED EMBODIMENT

The advantages and innovative features of the invention will become more apparent from the following descriptions of the preferred embodiments accompanied by the drawings.

Figure 1:
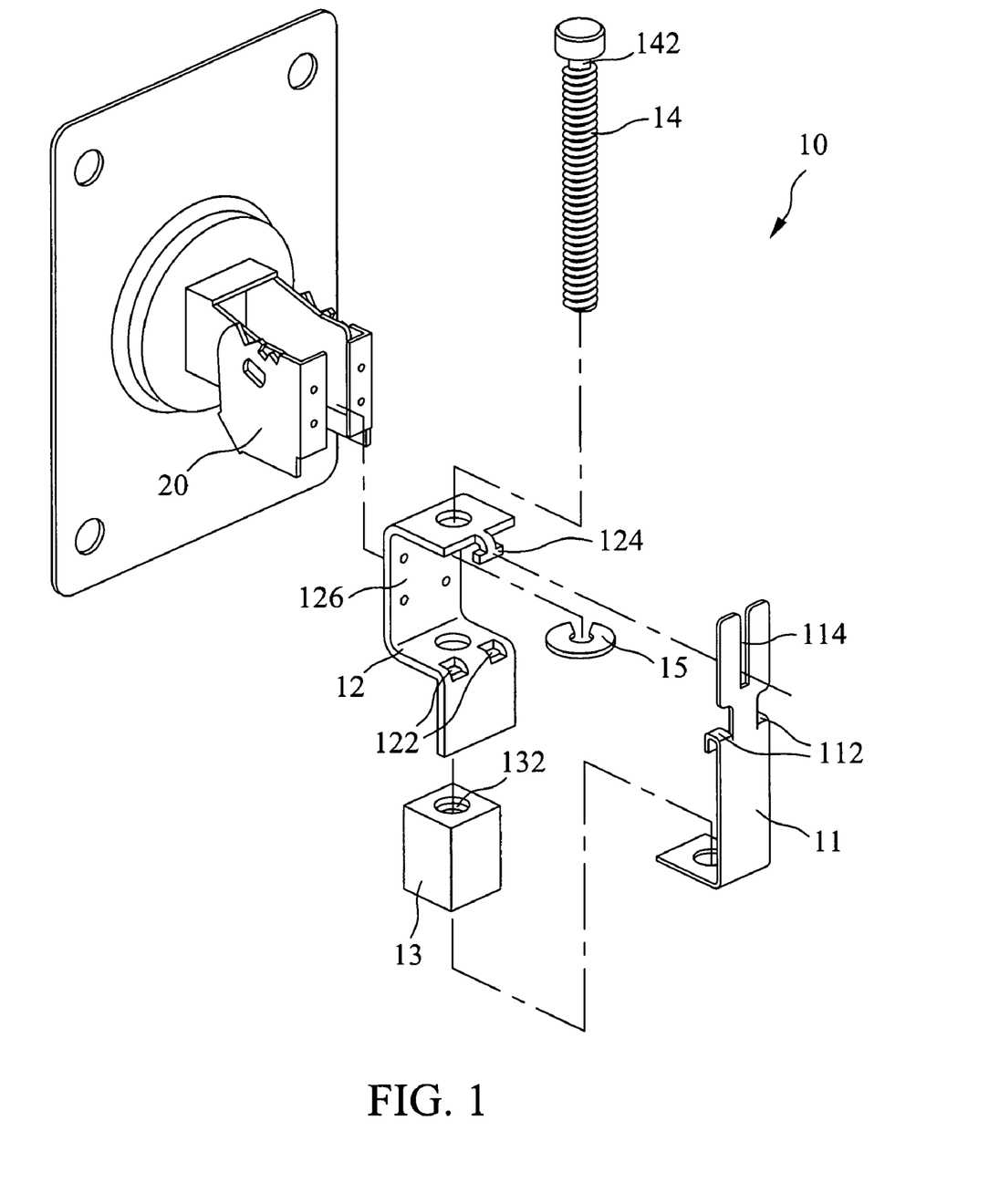
FIG. 1 is an explosive view of the adjustable shifting structure of the present invention.
Figure 2:
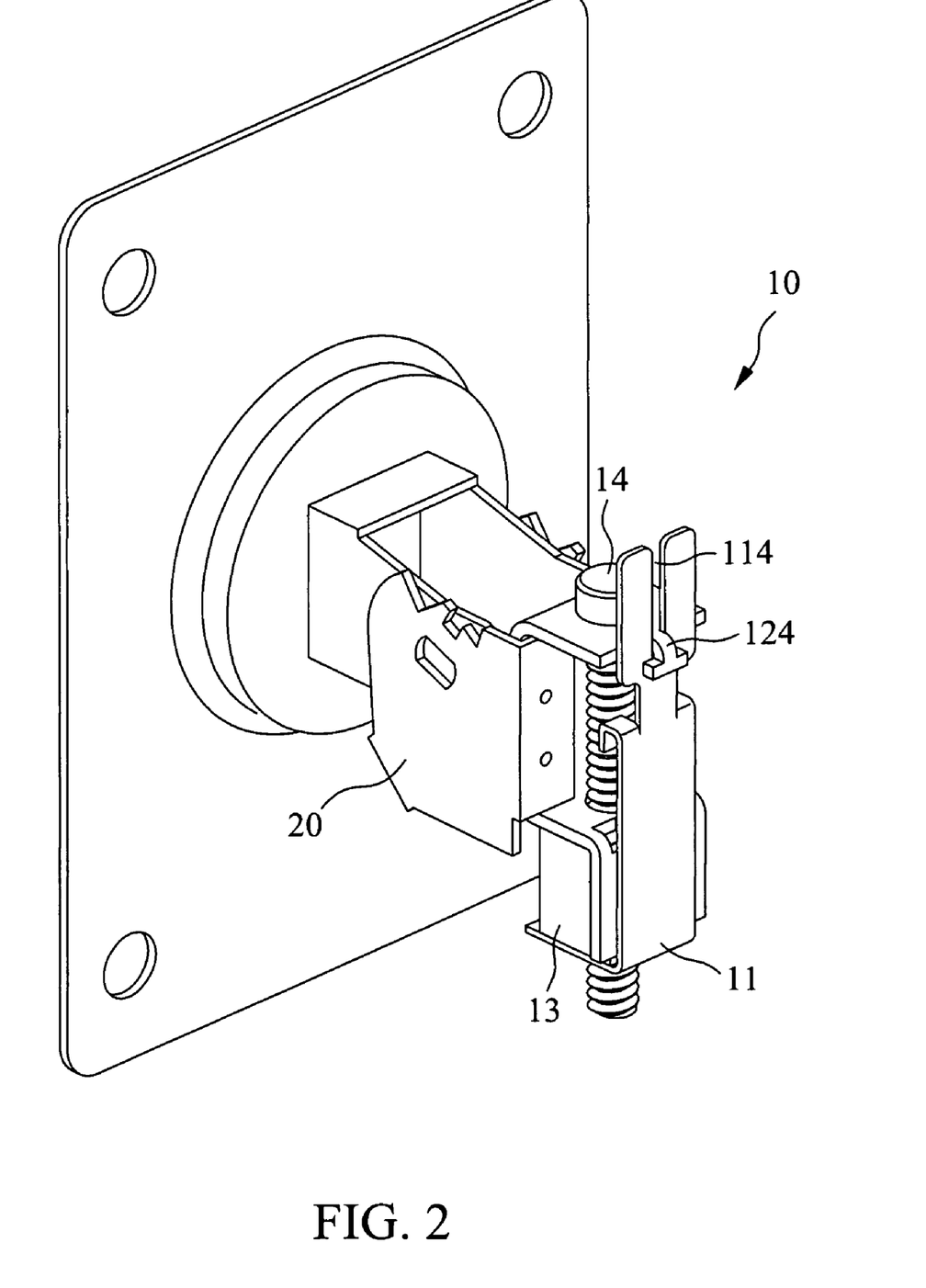
FIG. 2 is an illustrative diagram of the adjustable shifting structure of the present invention.

Please refer to FIG. 1 and FIG. 2. FIG. 1 is an explosive view of the adjustable shifting structure 10 of the present invention. FIG. 2 is an illustrative diagram of the adjustable shifting structure of the present invention. As shown in FIG. 1 and FIG. 2, the adjustable shifting structure 10 of the present invention is applied to a display device (not shown). The display device is connected with the adjustable shifting structure 10 via a loading seat 20. The adjustable shifting structure 10 of the present invention comprises a base bracket 11, a movable bracket 12, a fixture element 13, and an adjustment element 14. The base bracket 11 comprises at least one fastener 112 and a sliding groove 114. The movable bracket 12 comprises at least one corresponding hole 122, a positioning element 124, and a holding part 126. Each corresponding hole 122 is disposed correspondingly to each fastener 112, and the positioning element 124 corresponds to the sliding groove 114. The movable bracket 12 can be movably connected to the base bracket 11 by disposing the positioning element 124 into the sliding groove 114. The holding part 126 is connected to the loading seat 20 such that the loading seat 20 can be moved with the movable bracket 12. The fixture element 13 is connected to the base bracket 11, and a gap can be formed between one side of the fixture element 13 and the base bracket 11. The movable bracket 12 is capable of moving through the gap. The movable bracket 12 can be gripped by the fixture element 13 and the base bracket 11 via the gap such that the movable bracket 12 is supported and the moving direction of the movable bracket 12 is limited. Therefore, the movable bracket 12 is capable of being shifted along a longitudinal direction substantially by the positioning element 124 corresponding to the sliding groove 114.

The adjustment element 14 is extended through the base bracket 11, the fixture element 13, and the movable bracket 12 to provide a fixing and adjusting function to the whole structure. In this embodiment, the adjustment element 14 is a screw. Due to the mutual interaction between the threads of the adjustment element 14 and the corresponding thread hole 132 in the fixture element 13, the movable bracket 12 can be moved by adjusting the adjustment element 14 to apply force on the fixture element 13. Then the height of the adjustable shifting structure 10 of the present invention can be adjusted. However, the adjustment element 14 can be also replaced by other elements with similar adjusting functions without being limited to this embodiment.

Furthermore, the adjustment element 14 is revolvably connected to the movable bracket 12 so as to move the movable bracket 12 while the adjustment element 14 is adjusted. In this embodiment, the adjustable shifting structure 10 of the present invention further comprises an auxiliary fixing element 15. The auxiliary fixing element 15 is disposed between the movable bracket 12 and the adjustment element 14. The auxiliary fixing element 15 can be a connecting element to connect to the movable bracket 12 and allow the adjustment element 14 to revolve freely. Therefore, while adjustment element 14 is being adjusted, the movable bracket 12 can be moved with the auxiliary fixing element 15. The auxiliary fixing element 15 can be a C-shaped ring correspondingly disposed on the neck 142 without the thread. The thread of the adjustment element 14 may push the C-shaped ring and the C-shaped ring may push the movable bracket 12 while the adjustment element 14 is adjusted upward. Then the position of the movable bracket 12 can be adjusted. The connection between the adjustment element 14 and the movable bracket 12 can also be replaced by other methods or structures with similar functions without being limited to this embodiment.

The adjustable shifting structure 10 of the present invention is capable of being adjusted correspondingly for different display devices to maintain the stability of support and increase the structural strength. Furthermore, it is convenient to adjust the adjustable shifting structure 10 of the present invention via the adjustment element 14.

Figure 3:
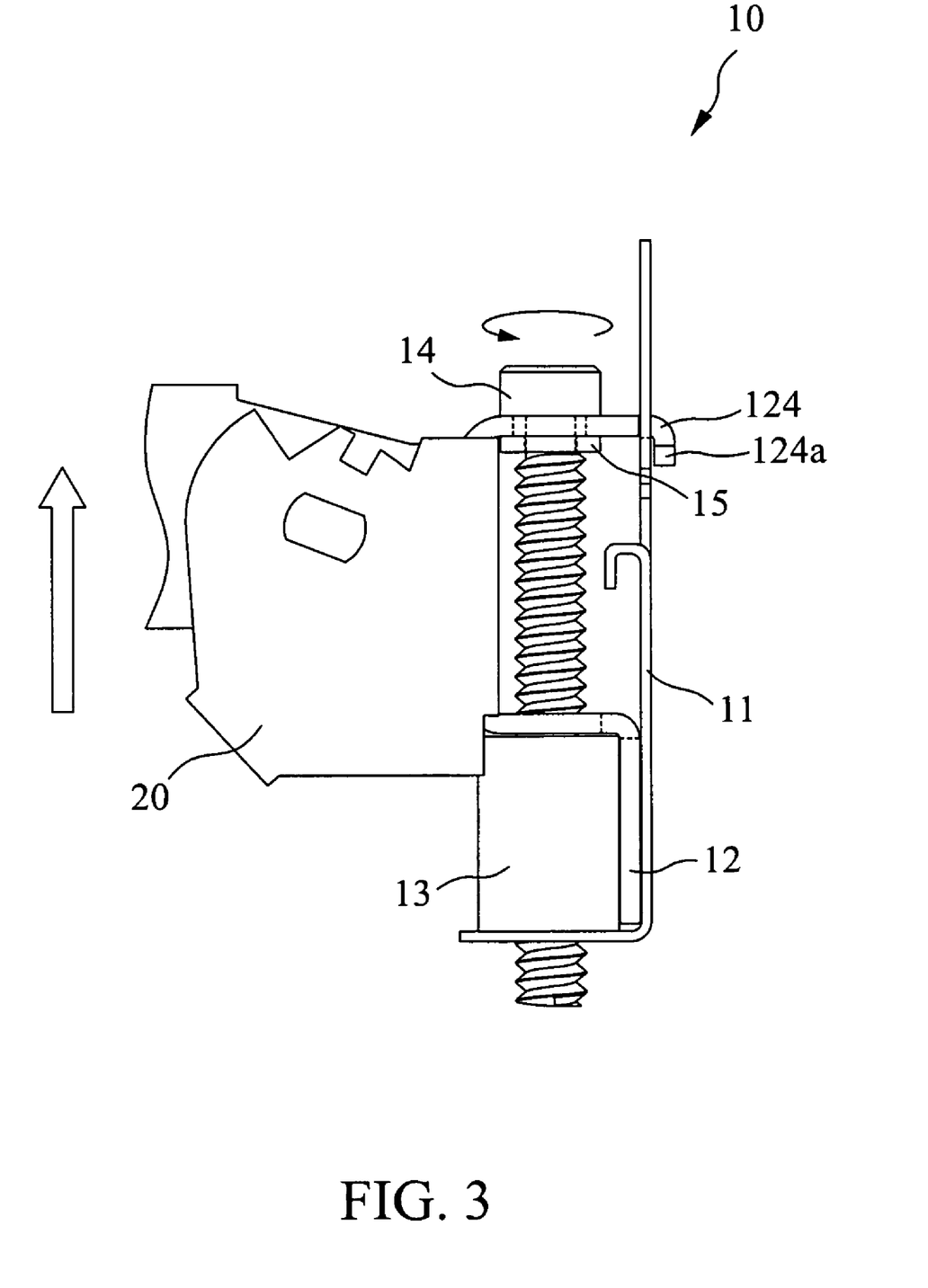
FIG. 3 is a side view diagram of the adjustable shifting structure of the present invention for adjusting the adjustable shifting structure to the lowest position.
Figure 4:
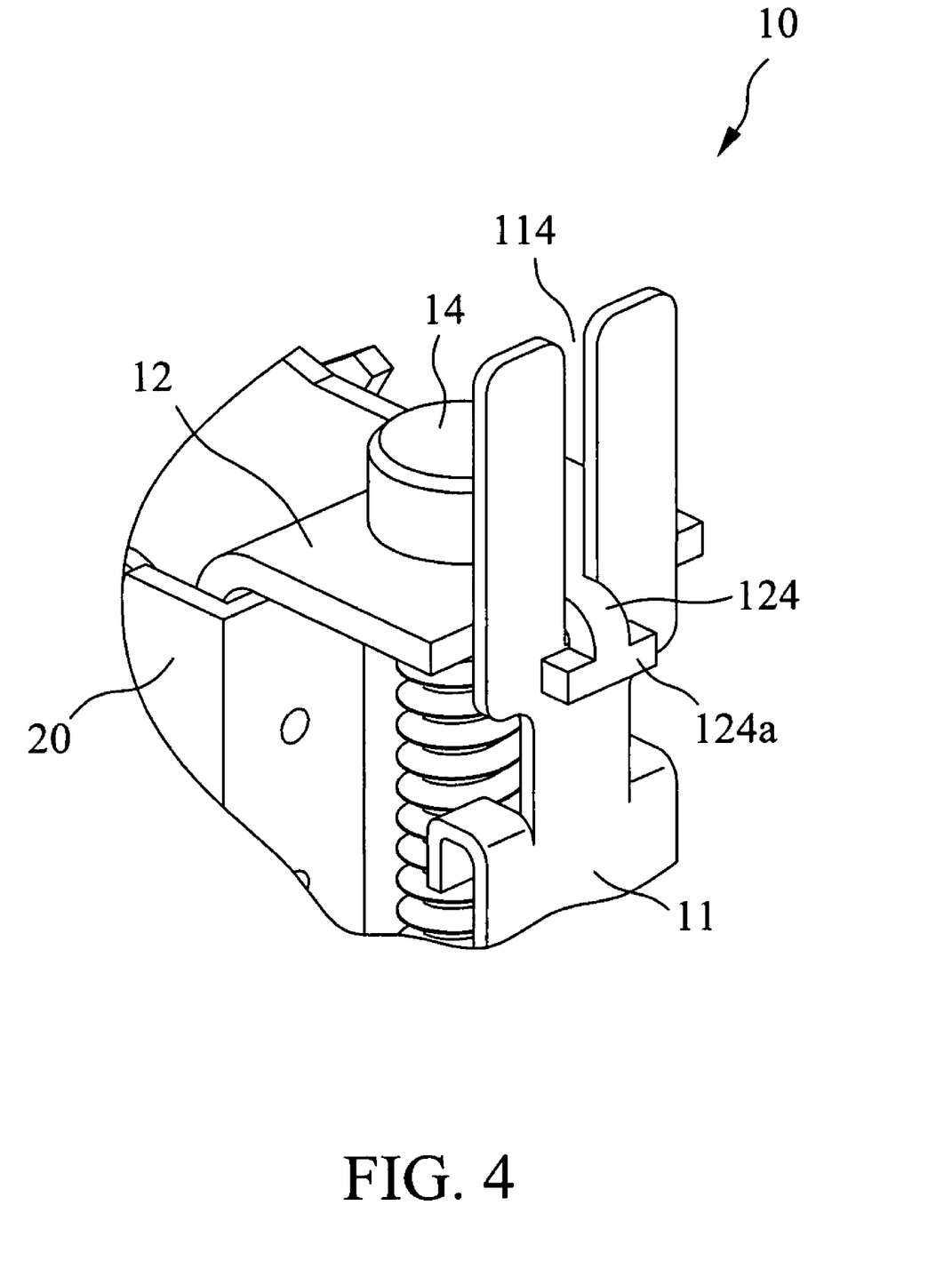
FIG. 4 is a partial diagram of the adjustable shifting structure of the present invention for adjusting the adjustable shifting structure to the lowest position.

Please refer to FIG. 3 and FIG. 4. FIG. 3 is a side view diagram of the adjustable shifting structure 10 of the present invention for adjusting the adjustable shifting structure 10 to the lowest position. FIG. 4 is a partial diagram of the adjustable shifting structure 10 of the present invention for adjusting the adjustable shifting structure 10 to the lowest position. As shown in FIG. 3 and FIG. 4, the movable bracket 12 of the adjustable shifting structure 10 of the present invention is movably connected to the sliding groove 114 of the base bracket 11 via the positioning element 124. In this embodiment, the positioning element 124 comprises a support part 124a. The width of the support part 124a is larger than the width of the sliding groove 114 such that the support part 124a can act as a fulcrum to support the movable bracket 12 while the movable bracket 12 is connected to the loading seat 20 for supporting the display screen. Moreover, the movable bracket 12 can be limited to moving along a fixture axial by the fixture element 13 and the base bracket 11 gripping the movable bracket 12 to maintain the stability of adjusting the adjustable shifting structure 10 of the present invention. When the adjustable shifting structure 10 of the present invention is adjusted downward a certain distance, the positioning element 124 can be supported by the bottom of the sliding groove 114 to limit the downward movement of the movable bracket 12. Furthermore, the downward movement of the movable bracket 12 may be limited by the base bracket 11 supporting the movable bracket 12.

Figure 5:
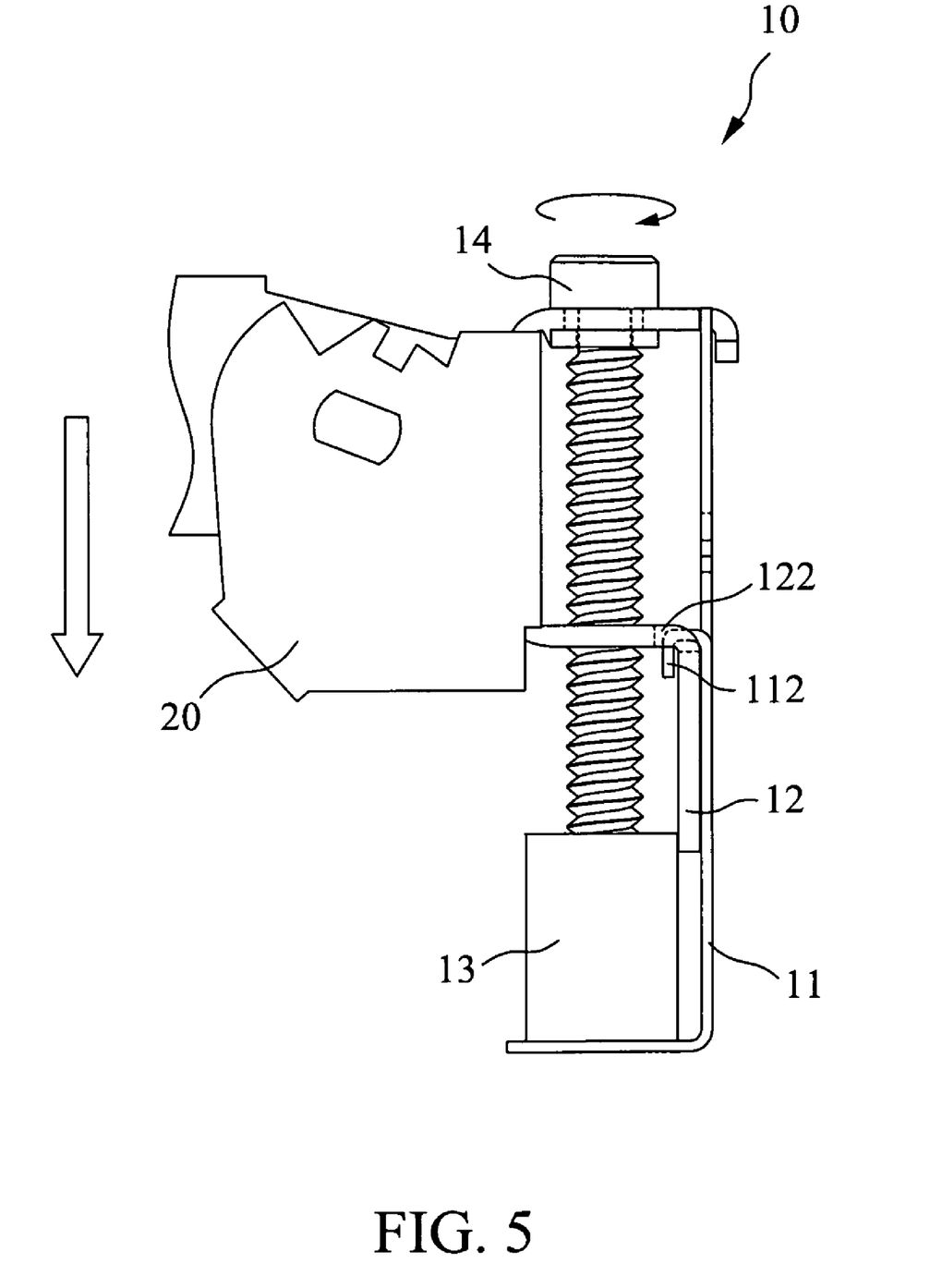
FIG. 5 is a side view diagram of the adjustable shifting structure of the present invention for adjusting the adjustable shifting structure to the highest position.
Figure 6:
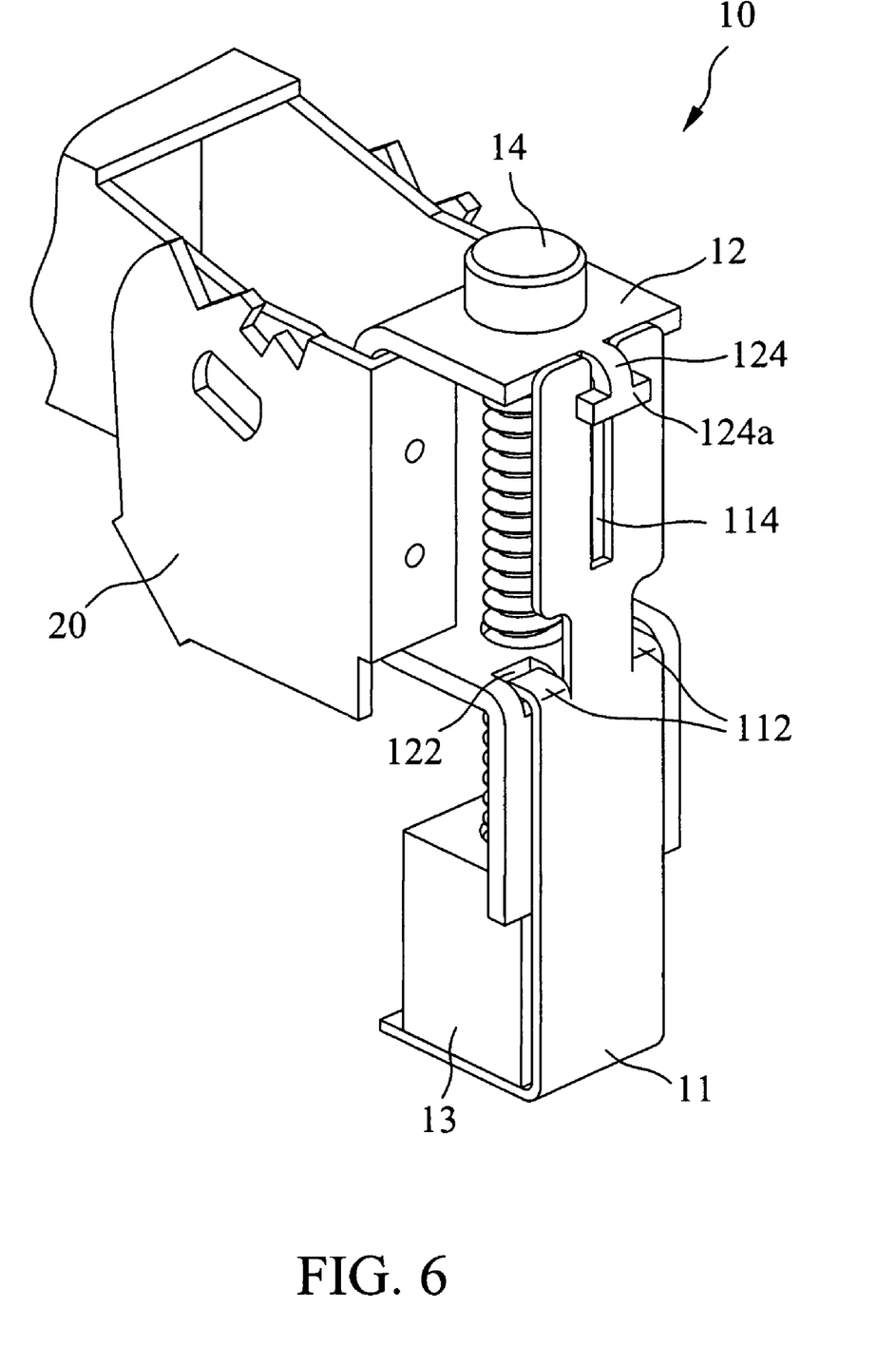
FIG. 6 is a partial diagram of the adjustable shifting structure of the present invention for adjusting the adjustable shifting structure to the highest position.

Please refer to FIG. 5 and FIG. 6. FIG. 5 is a side view diagram of the adjustable shifting structure 10 of the present invention for adjusting the adjustable shifting structure 10 to the highest position. FIG. 6 is a partial diagram of the adjustable shifting structure 10 of the present invention for adjusting the adjustable shifting structure 10 to the highest point. As shown in FIG. 5 and FIG. 6, the at least one fastener 112 of the base bracket 11 is disposed correspondingly to the at least one corresponding hole 122 of the movable bracket 12. While the adjustable shifting structure 10 of the present invention is adjusted upward a certain distance, the upward movement of the movable bracket 12 can be limited by the at least one fastener 112 hooking the at least one corresponding hole 122 to prevent the movable bracket 12 to come off the base bracket 11.

Furthermore, the lengths of the base bracket 10, the movable bracket 11, the fixture element 13 and the adjustment element 14 of the adjustable shifting structure 10 of the present invention all can be changed according to different requirements or designs. The corresponding elements for limiting the movement (for example, the combination of the positioning element 124 and the sliding groove 114, and the combination of the fastener 112 and the corresponding hole 122) can be disposed in different positions or be replaced by other structural elements which have the function of adjusting positions.

Figure 7:
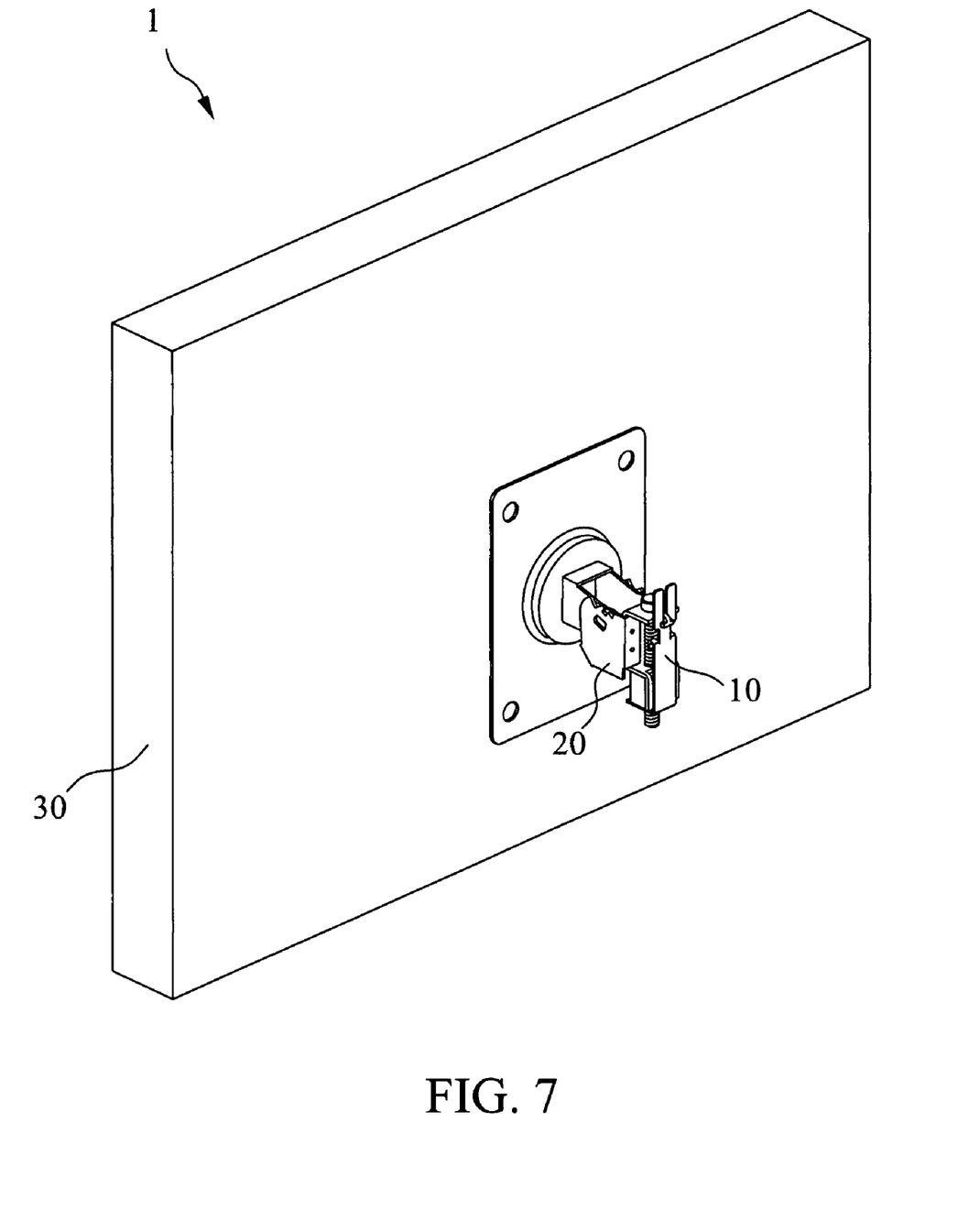
FIG. 7 is an illustrative diagram of the display device of the present invention.

Please refer to FIG. 7. FIG. 7 is an illustrative diagram of the display device of the present invention. As shown in FIG. 7, the display device 1 of the present invention comprises a display screen 30, a loading seat 20, and an aforementioned adjustable shifting structure 10. The loading seat 20 is connected to the display screen 30, and the adjustable shifting structure 10 is connected with the loading seat 20. The loading seat 20 can provide the adjustment functions for rotating the display screen 30 or changing the tilting angle of the display screen 30. The height of the loading seat 20 can be changed by adjusting the adjustable shifting structure 10 such that the display device 1 can maintain its stability during the adjusting process. Accordingly, it is easy to adjust the display device 1 of the present invention.

Although the present invention has been explained in relation to its preferred embodiments, it is to be understood that many other possible modifications and variations can be made without departing from the spirit and scope of the invention as hereinafter claimed.

What is claimed is:

1. An adjustable shifting structure applied to a display device, comprising:
   a base bracket comprising a sliding groove;
   a movable bracket comprising a positioning element movably connected to the sliding groove of the base bracket;
   wherein the positioning element comprises a support part, and the width of the support part is larger than the width of the sliding groove to support the movable bracket;
   a fixture element connected to the base bracket, with the movable bracket being gripped by the fixture element and the base bracket to limit the moving direction of the movable bracket; and
   an adjustment element extended through the base bracket, the fixture element and the movable bracket, the movable bracket being moved by adjusting the adjustment element to apply force on the fixture element.

2. The adjustable shifting structure according to claim 1, wherein the movable bracket comprises a holding part for connecting with a loading seat of the display device.

3. The adjustable shifting structure according to claim 1, wherein the base bracket comprises at least one fastener which corresponds to at least one corresponding hole of the movable bracket to limit the moving distance of the movable bracket.

4. The adjustable shifting structure according to claim 1, wherein the adjustment element is revolvably connected to the movable bracket.

5. The adjustable shifting structure according to claim 4, further comprising an auxiliary fixing element; the auxiliary fixing element is disposed between the movable bracket and the adjustment element, and the movable bracket can be moved with the auxiliary fixing element by adjusting the adjustment element.

6. A display device, comprising:
a display screen;
a loading seat connected to the display screen; and
an adjustable shifting structure connected with the loading seat, comprising:
a base bracket comprising a sliding groove;
a movable bracket comprising a positioning element movably connected to the sliding groove of the base bracket, wherein the positioning element comprises a support part, and the width of the support part is larger than the width of the sliding groove to support the movable bracket;
a fixture element connected to the base bracket, with the movable bracket being gripped by the fixture element and the base bracket to limit the moving direction of the movable bracket; and
an adjustment element extending through the base bracket, the fixture element and the movable bracket, the movable bracket being moved by adjusting the adjustment element to apply force on the fixture element so as to adjust the height of the display screen.

7. The display device according to claim 6, wherein the movable bracket comprises a holding part for connecting with the loading seat.

8. The display device according to claim 6, wherein the base bracket comprises at least one fastener which corresponds to at least one corresponding hole of the movable bracket to limit the moving distance of the movable bracket.

9. The display device according to claim 6, wherein the adjustment element is revolvably connected to the movable bracket.

10. The display device according to claim 9, wherein the adjustable shifting structure further comprises an auxiliary fixing element, the auxiliary fixing element is disposed between the movable bracket and the adjustment element, and the movable bracket can be moved with the auxiliary fixing element by adjusting the adjustment element.

* * * * *